United States Patent
Fadeev et al.

(10) Patent No.: US 10,178,193 B2
(45) Date of Patent: Jan. 8, 2019

(54) LOCATION-BASED INFERENCE OF USER CHARACTERISTICS

(71) Applicant: Facebook, Inc., Menlo Park, CA (US)

(72) Inventors: Aleksey Sergeyevich Fadeev, Seattle, WA (US); Liang Xu, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 334 days.

(21) Appl. No.: 15/236,228

(22) Filed: Aug. 12, 2016

(65) Prior Publication Data

US 2018/0048722 A1    Feb. 15, 2018

(51) Int. Cl.
*G06F 15/16* (2006.01)
*H04L 29/08* (2006.01)
*H04W 4/02* (2018.01)

(52) U.S. Cl.
CPC .............. *H04L 67/22* (2013.01); *H04L 67/02* (2013.01); *H04L 67/10* (2013.01); *H04L 67/18* (2013.01); *H04L 67/20* (2013.01); *H04L 67/306* (2013.01); *H04W 4/02* (2013.01)

(58) Field of Classification Search
CPC ......... H04L 67/22; H04L 67/02; H04L 67/10; H04L 67/18; H04L 67/20; H04L 67/306; H04W 4/02
See application file for complete search history.

(56) References Cited

U.S. PATENT DOCUMENTS

| | | | |
|---|---|---|---|
| 7,801,879 B2 * | 9/2010 | Jones ................ | G06F 17/30699 707/708 |
| 8,751,427 B1 * | 6/2014 | Mysen .................. | H04L 67/306 706/46 |
| 9,413,794 B1 * | 8/2016 | Saylor ................. | H04L 65/4076 |
| 2015/0262286 A1 * | 9/2015 | Cypher .............. | G06Q 30/0251 705/26.61 |
| 2016/0171588 A1 * | 6/2016 | Linden ............... | G06Q 30/0631 705/26.7 |
| 2017/0032384 A1 * | 2/2017 | Harris ................ | G06Q 30/0201 |
| 2017/0053022 A1 * | 2/2017 | Chan ................. | G06F 17/30241 |

* cited by examiner

*Primary Examiner* — Moustafa M Meky
(74) *Attorney, Agent, or Firm* — Fenwick & West LLP (57) ABSTRACT

An online system associates a user with a characteristic attribute of a geographic area in response to the user visiting the geographic area. The geographic area is identified based on visits by users of the online system, and attributes of entities associated with locations within the geographic area. A characteristic attribute is identified from the obtained attributes. A visit to the geographic area by a first user not associated with the characteristic attribute is identified. In response to identifying that the first user has visited the geographic area, the first user is associated with the characteristic profile attribute. Based at least in part on the association between the characteristic profile attribute and the first user, a content item is sent to a client device for presentation to the first user.

20 Claims, 3 Drawing Sheets

LOCATION-BASED INFERENCE OF USER CHARACTERISTICS

BACKGROUND

This disclosure relates generally to online systems, and more specifically to inferring characteristics of online system users from location data of the users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users thereof. To provide a more engaging experience to a user, online systems may recommend content to the user based on the user's interest. Although users may provide interests and other information about themselves as part of a user profile, such profiles are generally incomplete. In other words, user profiles do not contain an exhaustive list of all of a user's interests and activities. As a result of an incomplete user profile, the online system may fail to recommend content to the user that the user would find interesting. Thus, reliance on user-provided information for user profiles may result in missed opportunities to provide relevant content items to online system users.

SUMMARY

An online system serves content to users based on the users' profile attributes (e.g., interests, activities, beliefs). User profiles in the online system include explicit profile attributes provided by respective users. To improve selection of content of users, the online system infers implicit profile attributes of users. In particular, the online system uses geographic locations associated with a user profile to infer implicit profile attributes to associate with the user profile.

The online system identifies geographic areas based on visit information by users of the online system. For example, the online system identifies the geographic areas by clustering geographic locations of the user visits. The online system identifies a characteristic profile attribute corresponding to a geographic area from profile attributes associated with users that have visited the geographic area. The characteristic profile attribute is more commonly associated with users that have visited the geographic area than with users that have visited other geographic areas. The online system may also identify the characteristic profile attribute from profile attributes of businesses having locations within the geographic area. The online system associates the characteristic profile attribute with users that visit the geographic area. Once those users are implicitly associated with the characteristic profile attribute, the online system may recommend or target content items to the users based on the implicitly associated characteristic profile attribute.

As an example, the geographic area is a ski resort that receives a disproportionate number of visits from users that have explicitly expressed an interest in skiing as part of an online system profile. The online system associates the skiing profile attribute with other users that visit the ski resort and sends skiing-related content to those other users. Thus, the online system may deliver content that is more relevant to users' interests even when those users have not explicitly expressed those interests in a user profile.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
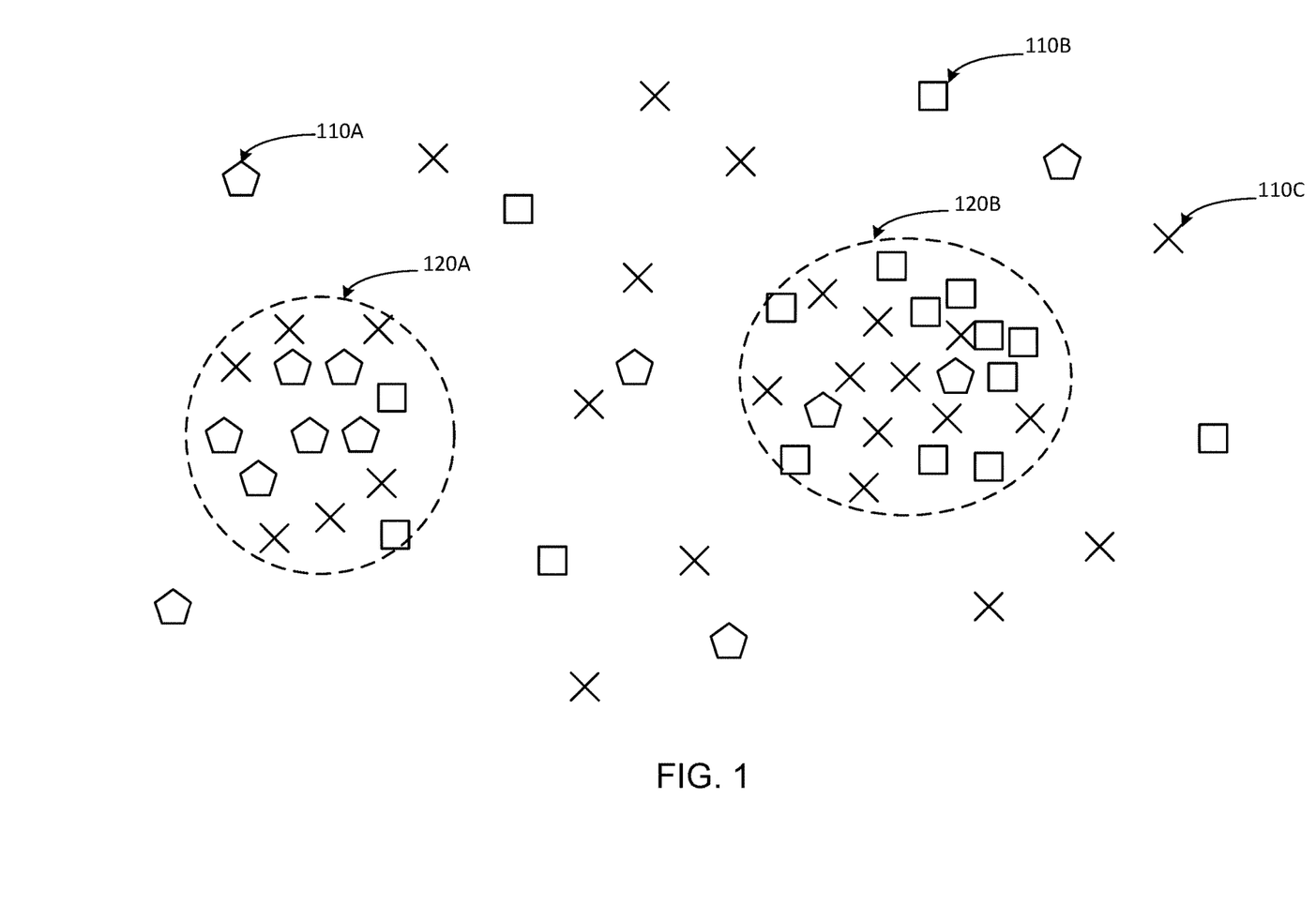
FIG. 1 is a conceptual diagram illustrating location-based inference of user characteristics, in accordance with an embodiment.

FIG. 1 is a conceptual diagram illustrating location-based inference of user characteristics, in accordance with an embodiment. The diagram illustrates locations 110 associated with user profiles on a simplified two-dimensional geographic map. In particular, the map illustrates visits 110 of user profiles associated with different profile attributes. A visit 110 refers to a geographic location associated with a user profile as a result of the user corresponding to the user profile accessing the online system from the location, or the user profile being associated with a content item that is tagged with the location, or the corresponding user providing explicit location check-ins to the online system, for example. A visit 110 may correspond to a one-time visit to the geographic location, a recurring visit to the geographic location, or a permanent presence in the geographic location (e.g., a place of business, a home). A user profile refers to a set of information about a user (e.g., an individual user, a business, an organization, another entity) including declarative information provided by the user, actions of the user in the online system (e.g., interactions with online system content, geographic locations of the user), and content provided by the user to the online system. A profile attribute refers to an interest (e.g., cultural, political, moral, religious), activity, or affiliation (e.g., educational, vocational, avocational, organizational) of a user included in the user profile corresponding to the user. A profile attribute may include declarative information explicitly provided by the user to the online system for inclusion in the user's user profile, or a profile attribute may include an implicit association between the user profile and the profile attribute based on the user's actions in the online system.

In the illustrated example, the visits 110 include visits 110A by user profiles associated with a first profile attribute (indicated by the pentagonal markers), visits 110B by user profiles associated with a second profile attribute (indicated by the square markers), and visits 110C by user profiles associated with neither the first nor second profile attributes (illustrated by the cross markers). The online system identifies geographic areas 120 based on clusters of the geographic locations of the visits 110. In the illustrated example, the online system identifies geographic areas 120A and 120B based on the visits 110 of the user profiles.

The geographic area 120A includes a disproportionate number of visits 110A of user profiles associated with the first profile attribute relative to other geographic areas. As a result, the online system infers that the user profiles associated with the visits 110B and 110C to other locations within the geographic area 120A should also be associated with the first profile attribute, even if they were not previously associated with the first profile attribute. Similarly, the geographic area 120B includes a disproportionate number of visits 110B of user profiles associated with the second profile attribute. As a result, the online system infers that the user profiles associated with the visits 110A and 110C to other locations within the geographic area 120B should also be associated with the second profile attribute.

For example, assume that the first profile attribute is an interest in hoagies, and the second profile attribute is an interest in snowmachines. Since the first geographic area 120A includes a disproportionate number of visits 110A by users interested in hoagies, it is likely that the first geographic area 120A corresponds to a deli (or multiple delis in proximity to each other). Accordingly, other users who have visited the geographic area 120A (corresponding to the one or more delis) are also likely to be interested in hoagies, so the online system associates those other users with the first profile attribute denoting an interest in hoagies, even though they previously lacked such an association (e.g., the users of those user profiles did not explicitly state an interest in hoagies).

As another example, assume that the second geographic area 120B includes a disproportionate number of visits 110B by users interested in snowmachines. The visits 110B also include business locations of business entities having business profiles in the online system indicating that those businesses sell snowmachines and snow machine accessories. Accordingly, it is likely that the second geographic area 120B corresponds to a snow park where users drive snowmachines as well as rental shops bordering the snow park where users may rent snowmachines. Based on the visit information, the online system may infer that other users who have visited the second geographic area 120B are also likely to be interested in snowmachines, so the online system associates the other users with the second profile attribute denoting an interest in snowmachines. The visits to locations outside the geographic areas 120 do not correspond to any particular clusters of profile attributes, so these visits do not cause the online system to associate the corresponding profiles with the first or second profile attributes.

System Architecture

Figure 2:
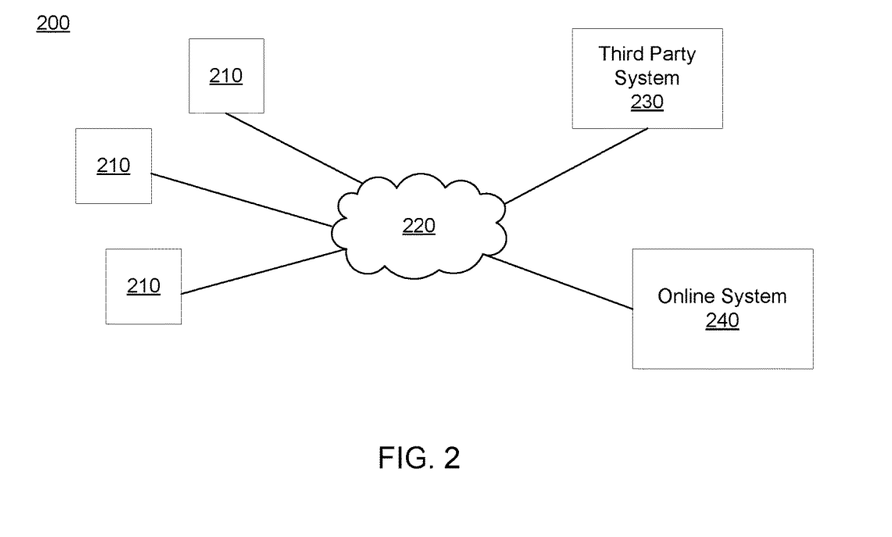
FIG. 2 is a block diagram of a system environment in which an online system operates, in accordance with an embodiment.

FIG. 2 is a block diagram of a system environment 200 for an online system 240. The system environment 200 shown by FIG. 2 comprises one or more client devices 210, a network 220, one or more third-party systems 230, and the online system 240. In alternative configurations, different and/or additional components may be included in the system environment 200. The embodiments described herein may be adapted to online systems that are social networking systems, content sharing networks, or other systems providing content to users.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone, a smart watch or another suitable device. A client device 210 is configured to communicate via the network 220. In one embodiment, a client device 210 executes an application allowing a user of the client device 210 to interact with the online system 240. For example, a client device 210 executes a browser application to enable interaction between the client device 210 and the online system 240 via the network 220. In another embodiment, a client device 210 interacts with the online system 240 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the online system 240, which is further described below in conjunction with FIG. 3. In one embodiment, a third party system 230 is an application provider communicating information describing applications for execution by a client device 210 or communicating data to client devices 210 for use by an application executing on the client device 210. In other embodiments, a third party system 230 provides content or other information for presentation via a client device 210. A third party system 230 may also communicate information to the online system 240, such as advertisements, content, or information about an application provided by the third party system 230.

In some embodiments, one or more of the third party systems 230 provide content to the online system 240 for presentation to users of the online system 240 and provide compensation to the online system 240 in exchange for presenting the content. For example, a third party system 230 may provide advertisement requests, which are further described below in conjunction with FIG. 3, including advertisements for presentation and amounts of compensation provided by the third party system 230 to the online system 240 in exchange for presenting the advertisements to the online system 240. Content presented by the online system 240 for which the online system 240 receives compensation in exchange for presenting is referred to herein as "sponsored content." Sponsored content from a third party system 230 may be associated with the third party system 230 or with another entity on whose behalf the third party system 230 operates.

Figure 3:
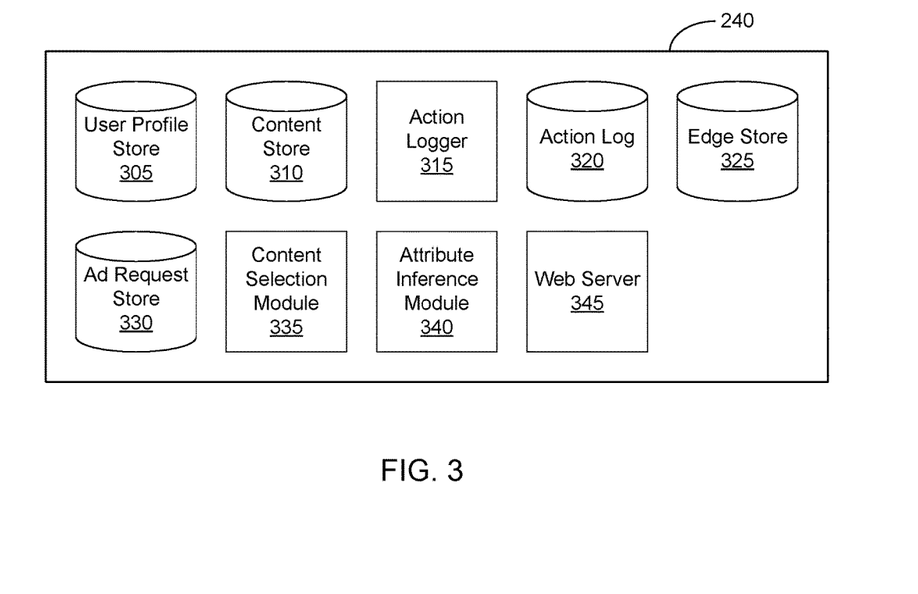
FIG. 3 is a block diagram of an online system, in accordance with an embodiment.

FIG. 3 is a block diagram of an architecture of the online system 240. The online system 240 shown in FIG. 3 includes a user profile store 305, a content store 310, an action logger 315, an action log 320, an edge store 325, an advertisement ("ad") request store 330, a content selection module 335, an attribute inference module 340, and a web server 345. In other embodiments, the online system 240 may include additional, fewer, or different components for various applications. Conventional components such as network interfaces, security functions, load balancers, failover servers, management and network operations consoles, and the like are not shown so as to not obscure the details of the system architecture.

Each user of the online system 240 is associated with a user profile, which is stored in the user profile store 305. A user profile includes profile attributes such as declarative information about the user that was explicitly shared by the user and information inferred by the online system 240. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the online system 240, user profiles may also be stored for entities such as businesses or other organizations. This allows an entity to establish a presence on the online system 240 for connecting and exchanging content with other online system users. The entity may post information about itself or its products or provide other information to users of the online system 240 using a brand page associated with the entity's user profile. Other users of the online system 240 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 310 stores objects of various types. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 240, events, groups or applications. In some embodiments, objects are received from third-party applications or third-party applications separate from the online system 240. In one embodiment, objects in the content store 310 represent single pieces of content, or content "items." Hence, online system users are encouraged to communicate with each other by posting text and content items of various types of media to the online system 240 through various communication channels. This increases the amount of interaction of users with each other and increases the frequency with which users interact within the online system 240.

The action logger 315 receives communications about user actions internal to and/or external to the online system 240, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 240 to track user actions on the online system 240, as well as actions on third party systems 230 that communicate information to the online system 240. Users may interact with various objects on the online system 240, and information describing these interactions is stored in the action log 320. Examples of interactions with objects include: commenting on posts, sharing links, checking-in to physical locations via a client device 210, accessing content items, and any other suitable interactions. Additional examples of interactions with objects on the online system 240 that are included in the action log 320 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 320 may record a user's interactions with advertisements on the online system 240 as well as with other applications operating on the online system 240. In some embodiments, data from the action log 320 is used to infer interests or preferences of a user, augmenting the interests included in the user's user profile and allowing a more complete understanding of user preferences.

The action log 320 may also store user actions taken on a third party system 230, such as an external website, and communicated to the online system 240. For example, an e-commerce website may recognize a user of an online system 240 through a social plug-in enabling the e-commerce website to identify the user of the online system 240. Because users of the online system 240 are uniquely identifiable, e-commerce websites, such as in the preceding example, may communicate information about a user's actions outside of the online system 240 to the online system 240 for association with the user. Hence, the action log 320 may record information about actions users perform on a third party system 230, including webpage viewing histories, advertisements that were engaged, purchases made, and other patterns from shopping and buying. Additionally, actions a user performs via an application associated with a third party system 230 and executing on a client device 210 may be communicated to the action logger 315 by the application for recordation and association with the user in the action log 320.

In one embodiment, the edge store 325 stores information describing connections between users and other objects on the online system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 240, such as expressing interest in a page on the online system 240, sharing a link with other users of the online system 240, and commenting on posts made by other users of the online system 240. Other edges are generated between a user and an object corresponding to a profile attribute in response to the user becoming associated (explicitly or implicitly) with the profile attribute.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, a likelihood that a user should be associated with a particular profile attribute, the rate at which the user logs into the online system 240, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, profile attributes (e.g., interests), and other users. Affinity scores, or "affinities," may be computed by the online system 240 over time to approximate a user's interest in an object or in another user, or a user's likelihood of being associated with a profile attribute based on the actions performed by the user. A user's affinity may be computed by the online system 240 over time to approximate the user's interest in an object, in a topic, or in another user in the online system 240 based on actions performed by the user. Computation of affinity is further described in U.S. patent application Ser. No. 12/978,265, filed on Dec. 23, 2010; U.S. patent application Ser. No. 13/690,254, filed on Nov. 30, 2012, now U.S. Pat. No. 9,070,141, issued Jun. 30, 2015; U.S. patent application Ser. No. 13/689,969, filed on Nov. 30, 2012, now U.S. Pat. No. 9,317,812, granted Apr. 19, 2016; and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

One or more advertisement requests ("ad requests") are included in the ad request store 330. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 240 if an advertisement in the ad request is presented to a user, if the advertisement in the ad request receives a user interaction when presented, or if any suitable condition is satisfied when the advertisement in the ad request is presented to a user. For example, the bid amount specifies a monetary amount that the online system 240 receives from the advertiser if an advertisement in an ad request is displayed. In some embodiments, the expected value to the online system 240 of presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 240. Targeting criteria may also specify interactions between a user and objects performed external to the online system 240, such as on a third party system 230. For example, targeting criteria identifies users who have taken a particular action, such as sent a message to another user, used an application, joined a group, left a group, joined an event, generated an event description, purchased or reviewed a product or service using an online marketplace, requested information from a third party system 230, installed an application, or performed any other suitable action. Including actions in targeting criteria allows advertisers to further refine users eligible to be presented with advertisement content from an ad request. As another example, targeting criteria identify users having a connection to another user or object or having a particular type of connection to another user or object. As another example, targeting criteria identify one or more profile attributes of users eligible for presentation of the advertisement.

The content selection module 335 selects one or more content items for communication to a client device 210 to be presented to a user. Content items eligible for presentation to the user are retrieved from the content store 310, from the ad request store 330, or from another source by the content selection module 335, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 335 includes content items eligible for presentation to the user in one or more selection processes, which identify a set of content items for presentation to the user. For example, the content selection module 335 determines measures of relevance of various content items to the user based on characteristics associated with the user by the online system 240 and based on the user's affinity for different content items. Information associated with the user included in the user profile store 305, in the action log 320, and in the edge store 325 may be used to determine the measures of relevance. Based on the measures of relevance, the content selection module 335 selects content items for presentation to the user. As an additional example, the content selection module 335 selects content items having the highest measures of relevance or having at least a threshold measure of relevance for presentation to the user. Alternatively, the content selection module 335 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 335 uses the bid amounts associated with ad requests when selecting content for presentation to the viewing user. In various embodiments, the content selection module 335 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 240 for presenting an advertisement from the ad request or for presenting the content item. For example, the expected value associated with an ad request is a product of the ad request's bid amount and a likelihood of the user interacting with the ad content from the ad request. The content selection module 335 may rank ad requests based on their associated bid amounts and select advertisements from ad requests having at least a threshold position in the ranking for presentation to the user. In some embodiments, the content selection module 335 ranks both content items not associated with bid amounts and ad requests in a unified ranking based on bid amounts associated with ad requests and measures of relevance associated with content items and with ad requests. Based on the unified ranking, the content selection module 335 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 335 receives a request to present a feed of content (also referred to as a "content feed") to a user of the online system 240. The feed may include one or more advertisements as well as content items, such as stories describing actions associated with other online system users connected to the user. The content selection module 335 accesses one or more of the user profile store 305, the content store 310, the action log 320, and the edge store 325 to retrieve information about the user and selects content items based on the retrieved information. For example, information describing actions associated with other users connected to the user or other data associated with users connected to the user is retrieved and used to select content items describing actions associated with one or more of the other users. As another example, the retrieved information describes an association (numerical or binary) between the user and a profile attribute. Additionally, one or more ad requests may be retrieved from the ad request store 330. The retrieved ad requests and other content items are analyzed by the content selection module 335 to identify candidate content items that are likely to be relevant to the user. For example, content items associated with users who not connected to the user or content items associated with users for whom the user has less than a threshold affinity are discarded as candidate content items. Based on various criteria, the content selection module 335 selects one or more of the candidate content items or ad requests identified as candidate content items for presentation to the user. The selected content items or advertisements from selected ad requests are included in a feed of content that is presented to the user.

In various embodiments, the content selection module 335 presents content to a user through a feed including a plurality of content items selected for presentation to the user. One or more advertisements may also be included in the feed. The content selection module 335 may also determine an order in which selected content items or advertisements are presented via the feed. For example, the content selection module 335 orders content items or advertisements in the feed based on likelihoods of the user interacting with various content items or advertisements.

The attribute inference module 340 generates associations between a user profile and profile attributes based on activities associated with the user profile in the online system 240. The attribute inference module 340 stores the association between the user profile and the profile attribute in the user profile store 305 or in the edge store 325. For example, when a user provides content corresponding to a profile attribute or is tagged in content corresponding to a profile attribute, the attribute inference module 340 associates the profile attribute with the user. As another example, the attribute inference module 340 associates a profile attribute with the user in response to a visit by the user to a geographic area where the profile attribute has been identified as a characteristic profile attribute, as described further with respect to FIG. 4. The association may be a binary association (having the attribute or not) or a numerical weight (e.g., a probability of having the attribute). Associating a profile attribute with a user profile may refer to the attribute inference module 340 generating an association between the user profile and the profile attribute, setting a numerical weight of association between the user profile and the profile attribute, or modifying the numerical weight of association between the user profile and the profile attribute.

The web server 345 links the online system 240 via the network 220 to the one or more client devices 210, as well as to the one or more third party systems 230. The web server 345 serves web pages, as well as other content, such as JAVA®, FLASH®, XML and so forth. The web server 345 may receive and route messages between the online system 240 and the client device 210, for example, instant messages, queued messages (e.g., email), text messages, short message service (SMS) messages, or messages sent using any other suitable messaging technique. A user may send a request to the web server 345 to upload information (e.g., images or videos) that are stored in the content store 310. Additionally, the web server 345 may provide application programming interface (API) functionality to send data directly to native client device operating systems, such as IOS®, ANDROID™, WEBOS® or BlackberryOS.

Associating Users with Profile Attributes

Figure 4:
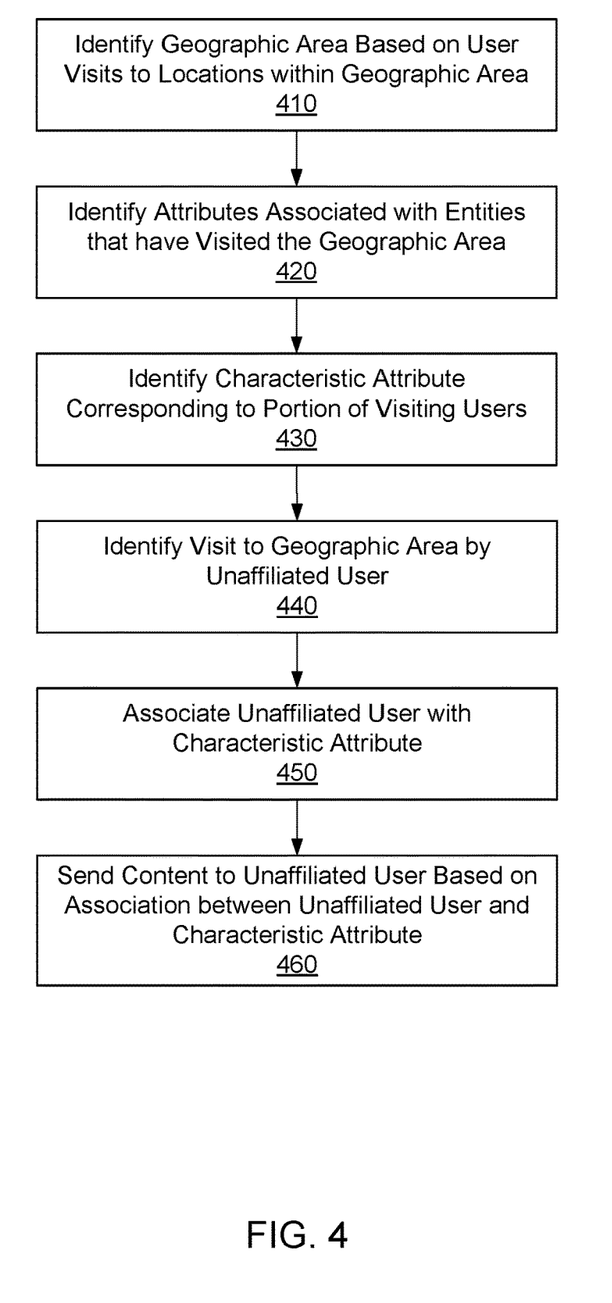
FIG. 4 is a flowchart of a method for associating users with profile attributes based on visits of users to locations within a geographic area, in accordance with an embodiment.

FIG. 4 is a flowchart of a method for associating users with profile attributes based on visits of users to locations within a geographic area, in accordance with an embodiment. In other embodiments, the method may include different and/or additional steps than those shown in FIG. 4. Additionally, steps of the method may be performed in different orders than the order described in conjunction with FIG. 4 in various embodiments.

The online system 240 identifies 410 a geographic area based on user visits to locations within the geographic area. A geographic area refers to a contiguous geographical space.

Typically, a geographic area has a boundary defined by latitude and longitude coordinates. However, a geographic area may further be defined based on altitude or height such that the geographic area corresponds to a three-dimensional volume (e.g., between ground level and one thousand feet above ground level or between the first through third floors of a building). Alternatively or additionally to using latitude and longitude to define a geographic area, the online system 240 uses an address (e.g., 383 Castro St., Mountain View, Calif.) to define a geographic area.

To identify 410 the geographic area, the online system 240 accesses visit information of user profiles. The visit information includes a geographic location (e.g., one or more of latitude, longitude, height) and the user profile that made the visit to the geographic location. The accessed visit information may optionally include a time or time range during which the visit occurred. The online system 240 may obtain the visit information from check-ins by users at a particular location (e.g., a location-tagged content item). The online system 240 may also obtain visit information from a geographic location corresponding to an access point to the online system 240. For example, the online system 240 identifies a visit by a user in response to the user accessing the online system 240 from an access point (e.g., cellular, local area network) associated with a location (e.g., based on a mapping of network address to location such as Internet Protocol address or Media Access Control address). As another example, the online system 240 identifies a visit to a location in response to the user making a transaction through the online system 240 at a business associated with a business location.

The online system 240 identifies 410 the geographic area by clustering locations from the accessed visit information. The online system 240 may use any suitable clustering algorithm (e.g., k-means). The online system 240 may use clustering with various granularities to identify 410 geographic areas at different scales. For example, in some embodiments the online system 240 performs a first batch of clustering with a large number of clusters to identify 410 small geographic areas corresponding to businesses and performs a second batch of clustering with a small number of clusters to identify 410 larger geographic areas corresponding to clusters of businesses (e.g., a ski resort and adjoining village base areas). In some embodiments, the online system 240 identifies 410 the geographic area based on both visit location (e.g., latitude, longitude) and visit time. For example, the online system 240 can collate the visit times based on recurring time periods (e.g., time of day, day of the week, time within the week, month) and cluster the visit information using location dimensions and a dimension corresponding to the visit times collated based on the recurring time period. Thus, in this example, the online system 240 identifies a cluster for a snow park during the weekend but not during the week because weekday usage is minimal.

The online system 240 identifies 420 profile attributes of the visiting users that have visited the geographic area. The online system 240 may identify the profile attributes by accessing user profiles of users that have visited the geographic area. For example, the identified profile attributes may include an explicit profile attribute corresponding to declarative information about a user provided by the user to the online system 240. As another example, the identified profile attributes may include an implicit profile attribute inferred by the online system 240. The implicit profile attribute has a numerical weighting corresponding to a likelihood that the user is associated with the implicit profile attribute, and the online system 240 identifies 420 the implicit profile attribute in response to the numerical weighting equaling or exceeding a threshold weight.

In some embodiments, the identified profile attributes may include profile attributes of entities such as businesses or other organizations associated with locations within the geographic area. Example profile attributes of entities may include products of the entity, keywords describing the entity (e.g., industry, sub-industry), or demographics of individuals that visit the entity (e.g., age range of students at a university, pre-dominant gender preference of patrons at a bar). Profile attributes of the entity may be explicitly added to the user profile of the entity by a representative of the entity. Alternatively or additionally, the online system 240 may infer profile attributes of an entity based on profile attributes of users that visit a location associated with the entity (e.g., place of business) or tag the entity in content provided to the online system. The online system 240 may also infer profile attributes of an entity from keywords in content sent to the online system 240 by the entity or by other users that tag the entity in association with the content.

The online system 240 identifies 430 a characteristic profile attribute from the obtained profile attributes that are associated with a portion of the visiting users. The online system 240 may identify 430 the characteristic profile attribute by determining a likelihood that the visiting users are associated with a particular profile attribute and comparing the determined likelihood to a threshold likelihood. In response to the determined likelihood exceeding the threshold likelihood, the online system 240 identifies 430 the particular profile attribute as the characteristic profile attribute.

The online system 240 may determine the likelihood that the visiting users are associated with the particular profile attribute based at least in part on statistics associated with the visiting users and the particular profile attribute. Profile attributes may be generally common across geographic areas, so a profile attribute may not necessarily be representative of a geographic area merely because its incidence among user profiles associated with the area is high. Accordingly, the online system 240 may normalize the frequency of profile attributes in a geographic area in order to control for overall incidence of the profile attribute. For example, the online system 240 determines a local proportion of the visiting users that are associated with the particular profile attribute and an overall proportion of users of the online system that are associated with the particular profile attribute. The online system 240 determines the likelihood that the visiting users are associated with the particular profile attribute based on the local proportion and the overall proportion. For example, in some embodiments the likelihood is proportional to the ratio of the local proportion of users associated with the particular profile attribute normalized by the overall proportion of users of the online system 240 associated with the particular profile attribute.

The online system 240 may normalize the determination of the likelihood by comparing the number of visits to the geographic area by users associated with a profile attribute relative to the number of visits to the geographic area by users in general. Thus, as an alternative, or in addition, to the factors above, the online system 240 determines the likelihood based at least in part on an attribute proportion of indicating a proportion of users associated with the particular profile attribute that have visited the geographic area as well as an overall location proportion indicating a proportion of online system users in general that have visited the geographic location. For example, the likelihood that the visiting users are associated with the particular profile attribute is proportional to the ratio of the location proportion normalized by the overall location proportion, per Bayesian statistics.

The online system 240 may differentiate between visits to the geographic area based on temporal factors in order to increase the weighting of profile attributes of users who spend more time (e.g., duration, frequency) in the geographic area. Thus, as an alternative, or in addition, to the factors above, the online system 240 may determine the likelihood that the visiting users are associated with the particular profile attribute based at least in part on a temporal weighting factor determined for one or more visits corresponding to each visiting user. The online system 240 may determine the temporal weighting factor from a frequency or number of the visiting user's one or more visits (e.g., including all the user's visits, including only the visiting user's visits occurring within a time period). Alternatively or additionally, the online system 240 may determine the temporal weighting factor from durations of the visiting user's one or more visits. The online system determines the likelihood based on a combination of the temporal weighting factors for the visiting users. For example, the likelihood is determined based on a linear combination where the temporal weighting factors of visitors associated with the particular profile attribute are positive and the temporal weighting factors of visitors not associated with the particular profile attribute are negative.

In some embodiments, the identification 430 of the characteristic profile attribute may be based on a machine learning model. For example, a machine learning model may be used to determine the likelihood of association between the particular profile attribute and the visiting users. Where the identification 430 of the characteristic profile attribute includes a comparison to a threshold likelihood, the online system 240 may determine the threshold likelihood using a machine learning model. Inputs to the machine learning model may include any combination of one or more of the factors listed previously, including the local proportion of users associated with the particular profile attribute, the overall proportion of users associated with the particular profile attribute, the proportion of users associated with the particular attribute that have visited the location, the overall location proportion of users that have visited the geographic area, temporal weighting factors determined for users associated with the particular profile attribute, and temporal weighting factors determined for users not associated with the particular profile attribute. Alternatively or additionally, the machine learning model uses other user profile information (e.g., demographics, associations with other user profile attributes) of the visiting users. The machine learning model may be trained using any suitable machine learning algorithm, such as a logistic regression, decision tree boosting, support vector machines, neural network techniques, or a combination thereof.

The online system 240 may train the machine learning model to identify 430 the characteristic profile attribute by presenting content associated with the characteristic profile attribute to users associated with the characteristic profile attribute and comparing interactions between users and the content item based on whether the user was explicitly or implicitly associated with the characteristic profile attribute. In detail, the online system 240 provides a test content item associated with the characteristic profile attribute to explicitly associated users that have added the characteristic profile attribute to their respective user profiles in the online system. The online system 240 determines an explicit interaction rate based on interactions (e.g., reactions, clicks, conversions, gaze time) between the explicitly associated users and the test content item. The online system 240 provides the test content item to implicitly associated users that are associated 450 with the characteristic profile attribute in response to the implicitly associated users visiting the geographic area. The online system 240 determines an implicit interaction rate based on interactions between the implicitly associated users and the test content item. The online system 240 determines parameters of the machine learning model based on a comparison between the implicit interaction rate and the explicit interaction rate. For example, the online system 240 modifies the parameters to reduce a difference between the implicit interaction rate and the explicit interaction rate. The online system 240 may also determine the threshold likelihood based on the comparison between the explicit interaction rate and the implicit interaction rate. For example, the online system 240 sets the threshold likelihood so that the difference between the explicit interaction rate and the implicit interaction rate does not exceed a threshold difference.

The online system 240 identifies 440 a visit to a geographic area by a visiting user not associated with the characteristic profile attribute identified with respect to the geographic area. For example, the visit is identified from visit information including a location inside the geographic area. The online system 240 associates 450 the visiting user with the characteristic profile attribute based at least in part on the visiting user visiting the geographic area. In some embodiments, associating 450 the visiting user with the characteristic profile attribute includes determining a numerical weight of the association. The online system 240 may determine the numerical weight based at least in part on the determined likelihood that the characteristic profile attribute is associated with users visiting the geographic area. The online system 240 may further determine the numerical weight based on characteristics of the visiting user. For example, in some embodiments the numerical weight is determined based at least in part on (e.g., proportionally to) at least one of a frequency of one or more visits by the visiting user to the geographic area and a duration of the one or more visits to the geographic area. Alternatively or additionally, the numerical weight is determined based at least in part on a weighted combination of a previous numerical weight of the association between the visiting user and the characteristic profile attribute and a numerical weight of the association determined in response to the visiting user visiting the geographic area.

The online system 240 sends 460 a content item to a client device for presentation to the visiting user based at least in part on the association between the characteristic profile attribute and the visiting user. For example, the content item may include targeting criteria naming the characteristic profile attribute, so the visiting user is eligible for presentation of the content item. As another example, the content item may be related to the profile attribute (e.g., includes content referencing the profile attribute, is associated with an advertisement request identifying the characteristic profile attribute), so the content item is more likely to be selected for presentation to the visiting user. If the association between the visiting user and the characteristic profile attribute includes a numerical weight, then sending the content item may be based at least in part on the numerical weight. For example, a content recommendation algorithm scores the content item associated with the profile attribute based at least in part on the numerical weight between the user and the profile attribute. The content item is then selected for presentation to the user based on a comparison of the score to a threshold score, a ranking among other content items based on the score, or a combination thereof.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   identifying a geographic area based on visits to locations within the geographic area by visiting users of an online system;
   identifying profile attributes of the visiting users that have visited the geographic area;
   identifying, from the identified profile attributes, a characteristic profile attribute associated with a portion of the visiting users;
   identifying a visit to the geographic area by a first user not associated with the characteristic profile attribute;
   associating the first user with the characteristic profile attribute responsive to identifying the visit by the first user; and
   sending a content item to a client device of the first user for presentation to the first user based at least in part on the association between the characteristic profile attribute and the first user.

2. The method of claim 1, wherein identifying the characteristic profile attribute comprises:
   determining a likelihood that the visiting users are associated with a particular profile attribute;
   comparing the determined likelihood to a threshold likelihood; and
   identifying the particular profile attribute as the characteristic profile attribute responsive to the determined likelihood exceeding the threshold likelihood.

3. The method of claim 2, wherein determining the likelihood that the visiting users are associated with the particular profile attribute comprises:
   determining a local proportion of the visiting users that are associated with the particular profile attribute;
   determining an overall proportion of users of the online system that are associated with the particular profile attribute; and
   determining the likelihood that the visiting users are associated with the particular profile attribute based on the local proportion and the overall proportion.

4. The method of claim 2, wherein determining the likelihood that the visiting users are associated with the particular profile attribute comprises:
   determining a temporal weighting factor for one or more visits by each visiting user based on at least one of a frequency of the user's one or more visits and a duration of the visiting user's one or more visits; and
   determining the likelihood that the visiting users are associated with the particular profile attribute based on determined temporal weighting factors of the visits.

5. The method of claim 2, wherein the threshold likelihood is determined based at least in part on a machine learning model trained by:
   providing a test content item associated with the characteristic profile attribute to explicitly associated users, the explicitly associated users associated with the characteristic profile attribute responsive to the explicitly associated users adding the characteristic profile attribute to respective user profiles in the online system;
   determining an explicit interaction rate based on interactions between the explicitly associated users and the test content item;
   providing the test content item to implicitly associated users, the implicitly associated users associated with the characteristic profile attribute responsive to the implicitly associated users visiting the geographic area;
   determining an implicit interaction rate based on interactions between the implicitly associated users and the test content item; and determining the threshold likelihood based on a comparison between the explicit interaction rate and the implicit interaction rate.

6. The method of claim 1,
wherein identifying the characteristic profile attribute comprises determining a likelihood that the visiting users are associated with a particular profile attribute,
wherein the association between the first user and the characteristic profile attribute includes a numerical weight determined based at least in part on the determined likelihood, and
wherein sending the content item to the client device for presentation to the first user comprises sending the content item based at least in part on the numerical weight.

7. The method of claim 6, wherein the numerical weight is determined based at least in part on at least one of a frequency of one or more visits by the first user to the geographic area and a duration of the one or more visits.

8. The method of claim 1, wherein identifying the geographic area based on the visits the geographic area comprises identifying visits to the geographic area by the visiting users during a recurring time period.

9. A computer program product comprising a computer readable storage medium having instructions encoded thereon that, when executed by a processor, cause the processor to:
identify a geographic area based on visits to locations within the geographic area by visiting users of an online system;
identify profile attributes of the visiting users that have visited the geographic area;
identify, from the identified profile attributes, a characteristic profile attribute associated with a portion of the visiting users;
identify a visit to the geographic area by a first user not associated with the characteristic profile attribute;
associate the first user with the characteristic profile attribute responsive to identifying the visit by the first user; and
send a content item to a client device of the first user for presentation to the first user based at least in part on the association between the characteristic profile attribute and the first user.

10. The computer program product of claim 9, wherein identifying the characteristic profile attribute comprises:
determining a likelihood that the visiting users are associated with a particular profile attribute;
comparing the determined likelihood to a threshold likelihood; and
identifying the particular profile attribute as the characteristic profile attribute responsive to the determined likelihood exceeding the threshold likelihood.

11. The computer program product of claim 10, wherein determining the likelihood that the visiting users are associated with the particular profile attribute comprises:
determining a local proportion of the visiting users that are associated with the particular profile attribute;
determining an overall proportion of users of the online system that are associated with the particular profile attribute; and
determining the likelihood that the visiting users are associated with the particular profile attribute based on the local proportion and the overall proportion.

12. The computer program product of claim 10, wherein determining the likelihood that the visiting users are associated with the particular profile attribute comprises:

determining a temporal weighting factor for one or more visits by each visiting user based on at least one of a frequency of the user's one or more visits and a duration of the visiting user's one or more visits; and
determining the likelihood that the visiting users are associated with the particular profile attribute based on determined temporal weighting factors of the visits.

13. The computer program product of claim 10, wherein the threshold likelihood is determined based at least in part on a machine learning model trained by:
providing a test content item associated with the characteristic profile attribute to explicitly associated users, the explicitly associated users associated with the characteristic profile attribute responsive to the explicitly associated users adding the characteristic profile attribute to respective user profiles in the online system;
determining an explicit interaction rate based on interactions between the explicitly associated users and the test content item;
providing the test content item to implicitly associated users, the implicitly associated users associated with the characteristic profile attribute responsive to the implicitly associated users visiting the geographic area;
determining an implicit interaction rate based on interactions between the implicitly associated users and the test content item; and
determining the threshold likelihood based on a comparison between the explicit interaction rate and the implicit interaction rate.

14. The computer program product of claim 9,
wherein identifying the characteristic profile attribute comprises determining a likelihood that the visiting users are associated with a particular profile attribute,
wherein the association between the first user and the characteristic profile attribute includes a numerical weight determined based at least in part on the determined likelihood, and
wherein sending the content item to the client device for presentation to the first user comprises sending the content item based at least in part on the numerical weight.

15. The computer program product of claim 14, wherein the numerical weight is determined based at least in part on at least one of a frequency of one or more visits by the first user to the geographic area and a duration of the one or more visits.

16. The computer program product of claim 9, wherein identifying the geographic area based on the visits the geographic area comprises identifying visits to the geographic area by the visiting users during a recurring time period.

17. A method comprising:
identifying a geographic area based on visits to locations within the geographic area by visiting users of an online system;
identifying attributes of entities having user profiles associated with locations within the geographic area;
identifying, from the identified attributes, a characteristic attribute associated with a portion of the entities;
identifying a visit to the geographic area by a first user;
associating the first user with the characteristic attribute responsive to identifying the visit by the first user; and
sending a content item to a client device of the first user for presentation to the first user based at least in part on the association between the characteristic attribute and the first user.

18. The method of claim 17, wherein the entities includes an organization having an organization location within the geographic area, and the attributes comprise a profile attribute included in a user profile of the organization in the online system.

19. The method of claim 17, wherein the entities includes an individual user having a user profile indicating the individual user has visited a location within the geographic area, and the attributes comprise a profile attribute associated with the user profile in response to the user providing declarative information to the online system.

20. The method of claim 17, wherein the association between the first user and the characteristic attribute is a numerical weight based on a characteristic attribute likelihood, wherein the characteristic attribute likelihood is determined based at least in part on a machine learning model trained by:

providing a test content item associated with the characteristic attribute to explicitly associated users, the explicitly associated users associated with the characteristic attribute based on declarative information provided to the online system by the explicitly associated users;

determining an explicit interaction rate based on interactions between the explicitly associated users and the test content item;

providing the test content item to implicitly associated users, the implicitly associated users associated with the characteristic attribute responsive to the implicitly associated users visiting the geographic area;

determining an implicit interaction rate based on interactions between the implicitly associated users and the test content item; and determining parameters of the machine learning model based at least in part on a comparison between the implicit interaction rate and the explicit interaction rate.

* * * * *